US009213952B2

(12) United States Patent
Heyman et al.

(10) Patent No.: US 9,213,952 B2
(45) Date of Patent: *Dec. 15, 2015

(54) AUTOMATIC SCHEDULING TOOL

(75) Inventors: Jerrold M. Heyman, Research Triangle Park, NC (US); Kenton R. Milligan, Rochester, MN (US); Michael L. Nelson, Research Triangle Park, NC (US); Antonio Pirraglia, Poughkeepsie, NY (US); Andrew G. Tonkin, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/448,595

(22) Filed: Apr. 17, 2012

(65) Prior Publication Data
US 2012/0296993 A1 Nov. 22, 2012

Related U.S. Application Data

(63) Continuation of application No. 13/109,571, filed on May 17, 2011.

(51) Int. Cl.
G06F 15/16 (2006.01)
G06Q 10/06 (2012.01)
(52) U.S. Cl.
CPC ..................... *G06Q 10/06* (2013.01)
(58) Field of Classification Search
CPC ............ G06Q 10/109; G06Q 10/1095; G06Q 10/1093; G06Q 10/10; G06Q 10/06311; H04L 12/1818; H04L 67/22; H04M 1/72566
USPC ........................................................ 709/206
See application file for complete search history.

(56) References Cited

U.S. PATENT DOCUMENTS

| 5,323,314 | A | * | 6/1994 | Baber et al. ................... 705/7.19 |
| 5,960,406 | A | * | 9/1999 | Rasansky et al. ............ 705/7.18 |
| 6,584,493 | B1 | * | 6/2003 | Butler ............................ 709/204 |
| 7,703,048 | B2 | | 4/2010 | Alford et al. |
| 7,720,828 | B2 | | 5/2010 | Bookstaff |
| 2004/0111479 | A1 | | 6/2004 | Borden et al. |
| 2005/0027805 | A1 | | 2/2005 | Aoki |
| 2007/0073810 | A1 | * | 3/2007 | Adams et al. .................. 709/205 |
| 2007/0124371 | A1 | * | 5/2007 | Desai et al. .................... 709/204 |
| 2008/0034305 | A1 | * | 2/2008 | Hawley et al. ................. 715/764 |

(Continued)

OTHER PUBLICATIONS

Chan et al., Instant Messaging Bots: Accountability and Peripheral Participation for Textual User Interfaces, Proceedings of the 2005 International ACM SIGG Group Conference on Supporting Group Work, 2005, pp. 113-115.

(Continued)

*Primary Examiner* — Douglas Blair
*Assistant Examiner* — Imran Moorad
(74) *Attorney, Agent, or Firm* — Lieberman & Brandsdorfer, LLC

(57) ABSTRACT

Embodiments of the invention relate to a message based scheduling tool employed to function with an electronic calendar. As messages are transmitting between clients, a tool is employed to parse the messages to search for one or more string(s) of characters characteristic of a meeting. Based upon these characteristics and the parsing, the electronic calendars are searched to find an available time slot on both calendars in which a meeting can take place, and, if an available time is found, the meeting is scheduled and the clients are sent notification of the scheduling.

12 Claims, 5 Drawing Sheets

(56) References Cited

U.S. PATENT DOCUMENTS

| | | |
|---|---|---|
| 2008/0077888 A1 | 3/2008 | Miksovsky |
| 2008/0228548 A1* | 9/2008 | McBrearty et al. ............... 705/9 |
| 2009/0210351 A1* | 8/2009 | Bush et al. ..................... 705/80 |
| 2009/0228321 A1 | 9/2009 | Srinivasan et al. |
| 2009/0271716 A1* | 10/2009 | Jones et al. .................. 715/758 |
| 2010/0049808 A1* | 2/2010 | Rosenberg ................... 709/206 |
| 2010/0070877 A1* | 3/2010 | Scott et al. .................... 715/751 |
| 2011/0055196 A1* | 3/2011 | Sundelin et al. ............. 707/711 |
| 2011/0184943 A1* | 7/2011 | Norton et al. ................. 707/723 |
| 2012/0022909 A1* | 1/2012 | Ayatollahi et al. ........... 705/7.19 |

OTHER PUBLICATIONS

IBM, Automatic Instant Message Robot Butler, pp. 1-2, Oct. 24, 2008.

Liwanag, J.V.E. et al., Prototype Web Services and Instant Messaging Integration, Department of Information Systems and Computer Science, Ateneo De Manila University, pp. 1-6.

\* cited by examiner

AUTOMATIC SCHEDULING TOOL

CROSS REFERENCE TO RELATED APPLICATION(S)

This application is a continuation patent application claiming the benefit of the filing date of U.S. patent application Ser. No. 13/109,571 filed on May 17, 2011 and titled "Automatic Scheduling Tool", which is hereby incorporated by reference.

BACKGROUND

1. Technical Field

The present invention relates to a method and system for dynamic and interactive management of a calendar. More specifically, the invention relates to a system and method that creates a calendar entry based upon message communications.

2. Description of the Prior Art

Calendars come in various forms and sizes. Some calendars are on paper and others are electronic. With the advent of technology, electronic calendars have become popular as tools to maintain personal and/or business schedules. Within the category of electronic calendars, there are private calendars and semi-private calendars. A private electronic calendar is a calendar that is not shared among account holders. More specifically, the acts of creating entries and viewing entries are limited to the account holder. A semi-private electronic calendar is a calendar that is shared among multiple account holders. The sharing of the calendar enables each account holder to enter and schedule appointments on the same calendar. At the same time, since the calendar is shared, each account holder can at least see entries of the other account holders, and depending upon the settings may allow some or all of the account holders to make entries on the shared calendar. Accordingly, an electronic calendar is a prior art solution that addresses scheduling in an electronic medium that may be shared among multiple account holders.

Each appointment in an electronic calendar is reflected as an entry in a schedule. In a personal environment, entries are created for appointments, meetings, etc. Entries in a work environment are made in a similar manner. However, the act of creating an entry on the calendar interrupts ongoing processes. At the same time, if a meeting with another party is scheduled, a common date and time must be entered on the calendars of the respective parties. This type of scheduling is cumbersome and may require multiple communications, either oral or written, to ascertain a common time and location for the meeting.

SUMMARY OF THE INVENTION

This invention comprises a method for dynamic calendar management.

In one aspect, a computer implemented method is provided for use with message based communication. More specifically, a communication tool is employed to parse content embedded within a message being communicated. More specifically, the tool searches for and parses one or more select string of characters within the message(s), with the string of characters exhibiting characteristics of a request or need for a meeting. In response to the message parsing, electronic calendars of each of the parties identified within the message are searched to find at least one mutually available time to schedule the meeting based upon the exhibited characteristics. Each of the identified parties is then presented with at least one common and available date and time for the meeting.

In another aspect, a computer implemented method is provided for use with message based communication. A first client is configured with a first electronic calendar. Similarly, a second client is configured with a second electronic calendar. At such time as the first and second clients participate in a real-time direct text-based communication, a communication tool parses message content embedded in at least one message being communicated between the clients. The parsing includes searching for one or more select string of characters within the message, with the searched string of characters having characteristics of a meeting. First and second electronic calendars are searching to find a mutually available time slot to schedule the meeting based upon the characteristics. In response to finding a matching available time on the first and second calendars, each of the first and second clients are presented with at least one common and available date and time for the meeting.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1A:
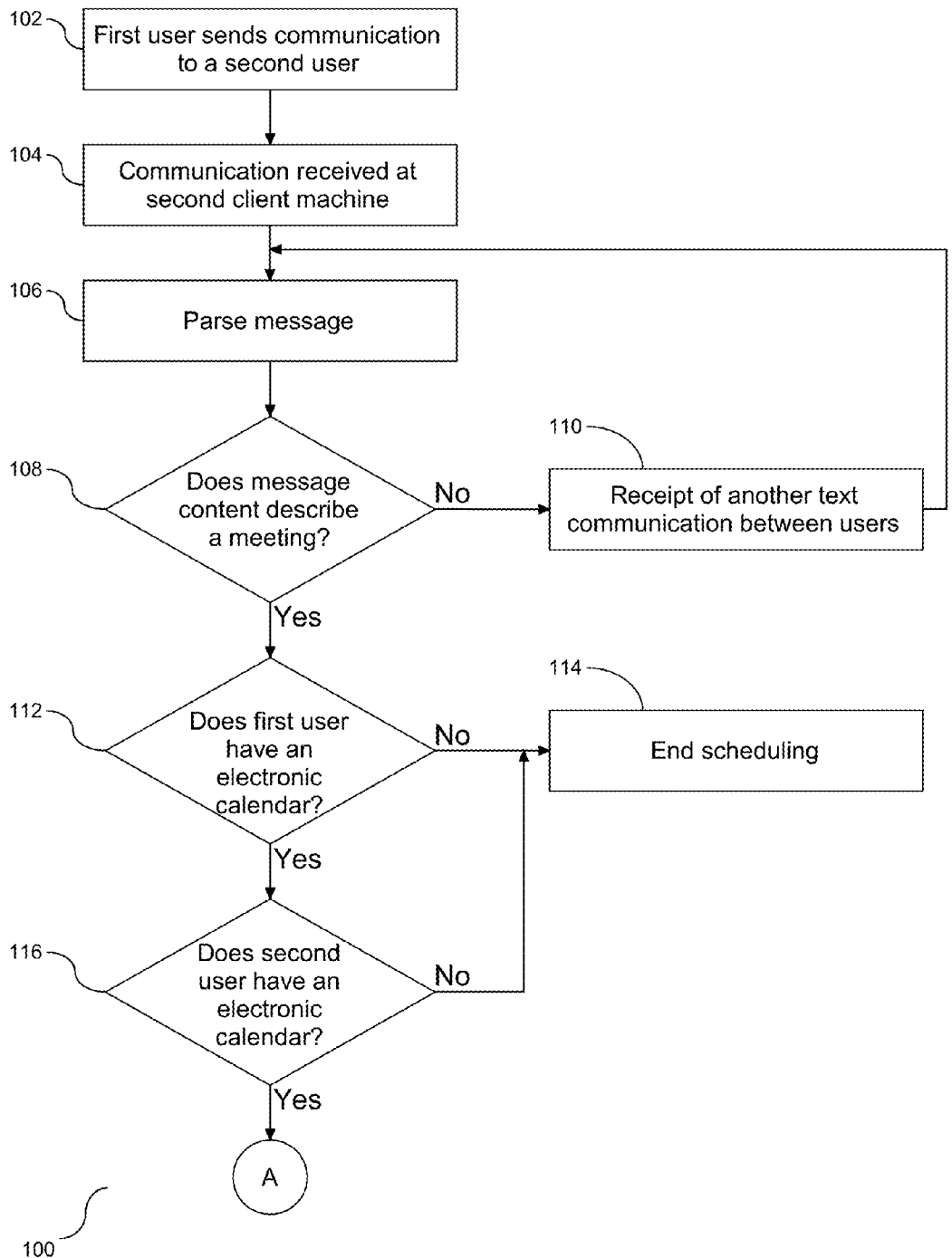
FIGS. 1A and 1B are a flowchart illustrating a process for scheduling an appointment and creating a calendar entry for the appointment all based upon real-time direct text-based communication(s) between at least two clients over a network.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as tools, modules, and/or managers. The functional units may be implemented in programmable hardware devices such as field programmable gate arrays, programmable array logic, programmable logic devices, or the like. The functional units may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Two electronic tools are becoming abundantly popular for managing schedules and associated communication. One of the electronic tools pertains to message based communication, and the other electronic tool is an electronic calendar. Message based communication between two or more people employing separate electronic devices can come in different forms, including but not limited to, text based messaging of portable telecommunication devices, non-real-time electronic mail communication, and real-time direct text-based communication between two or more people. Other forms of text based communication may exist, and as such, the examples shown herein are not considered limiting. The message based communication supports communication via text in place of or supplementary to voice based communication. Real-time direct text-based communication emulates a conversation in a text form as opposed to a verbal form. In effect, the real-time direct text-based communication employs a conduit between two electronic devices and supports real-time transmission of messages.

An electronic calendar is a calendar embedded and saved in an electronic format. There are different forms and configurations of these calendars. One such form enables a user to set-up and maintain the calendar on a location within a distributed network. The user establishes a login name and password to view and manage their settings on the calendar, including setting up meetings and appointments in electronic form. The user can login to access their calendar from any client machine in communication with the distributed network, and in one embodiment from a mobile device, including but not limited to a mobile telephone. Another form is an electronic calendar stored in data storage local to the client. In this form, the user can access their calendar from local data storage. Accordingly, the electronic calendar enables a user to cease use of a conventional calendar by replacing a paper based ledger with an electronic format.

Figure 1B:
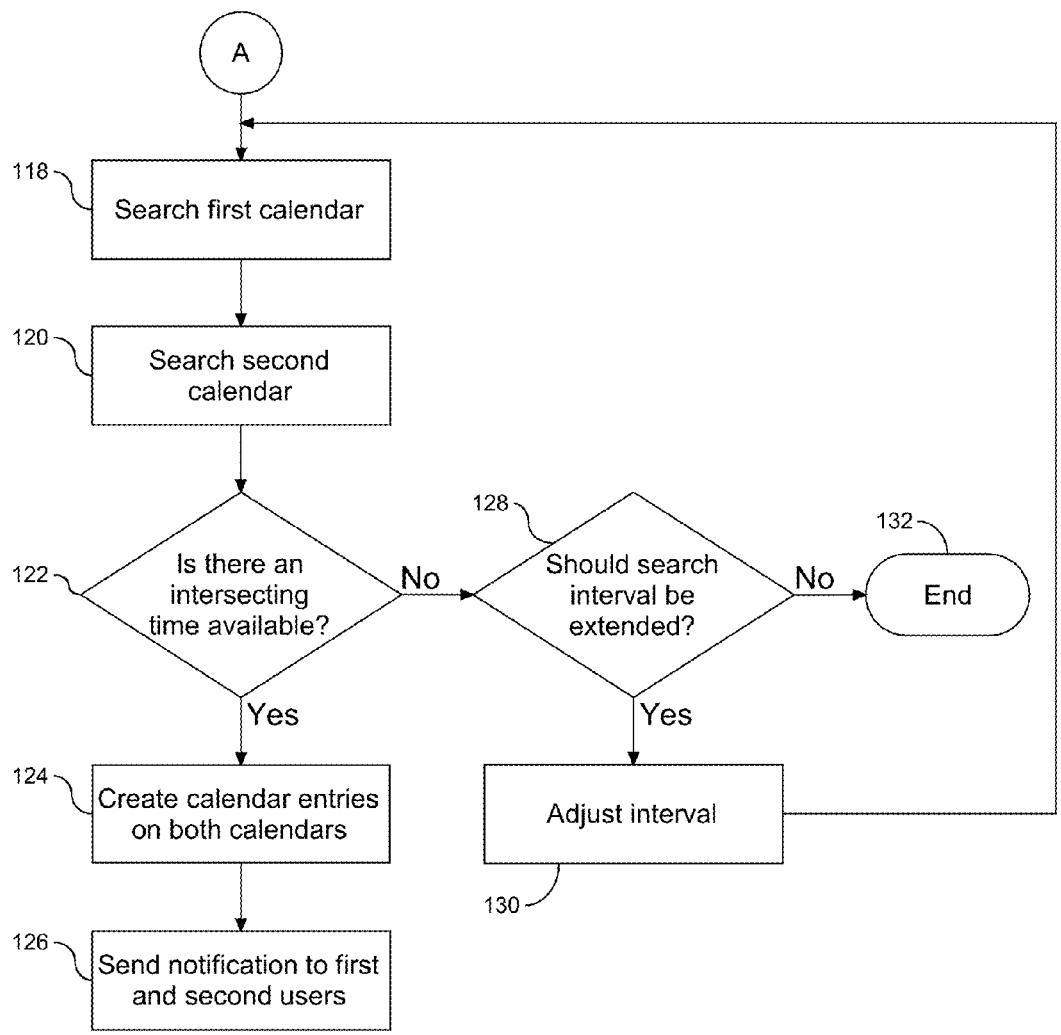

Message based communication is merged with the electronic calendar to facilitate scheduling meetings and/or activities in an automated manner. FIGS. 1A and 1B are a flowchart (100) illustrating a process for scheduling an appointment and creating a calendar entry for the appointment all based upon real-time direct text-based communication(s) between at least two clients over a network. The process starts at step (102) with a first user associated with a first client machine sending a real-time communication over a network to a second user associated with a second client machine. In one embodiment, the communication is sent over the network by using a real-time direct text-based communication protocol supported by the first and second client machines, such that the communication is representative of a text based conversation. In another embodiment, the communication between the first and second client machines may be in non-real-time. Similarly, in another embodiment the number of client machines participating in the text based conversation is not limited to two client machines and may include three or more machines. Accordingly, the message based communication may be in real-time or non-real-time between two or more client machines across a network.

As shown, in step (104), the text-based communication is received at the second client machine. Following receipt at step (104), the received message is parsed for one or more select string(s) of characters or words characterizing an attribute of a meeting time (106). In other words, as a message is communicated from the first client machine to the second client machine, the content of the message is parsed for specific message content. In one embodiment, the aspect of parsing takes place for each communicated text-based message. Following the parsing of the message at step (106), it is determined if the message content included one or more words, phrase(s), or string(s) of characters that are associated with the desire or need for the parties of the text-based communication to have a meeting (108). If the select words, phrase(s), or string of characters are not present, the text-based messaging may continue with receipt of another text-based communication between the users (110), followed by a return to step (106) to parse the next message in the text-based conversation. Conversely, if at step (108) it is determined that the select words, phrase(s), or string of characters are present in the communication, then the scheduling process is initiated. The parsing of the text-based message takes place for each communicated message. In one embodiment, the parsing continues parallel to the scheduling evaluation.

As described above, electronic calendars are a commonly used tool for scheduling meetings and activities. Following a positive response to the determination at step (108), it is determined if the user associated with the first client machine has an electronic calendar account (112). In one embodiment, the electronic calendar account information may be embedded within a profile associated with the user. A negative response to the determination at step (112) concludes the scheduling process (114). Conversely, a positive response to the determination at step (112) is followed by determining if the user associated with the second client machine has an electronic calendar account (116). A negative response to the determination at step (116) concludes the scheduling process (114). However, a positive response to the determination at step (116) enables the calendar scheduling process to proceed. More specifically, following the positive response at step (116), the calendar of the user associated with the first machine is searched for meeting availability (118), as is the calendar of the user associated with the second machine (120). It is then determined if the searching at steps (118) and (120) have an intersecting time interval available for scheduling a meeting (122). In one embodiment, the determination at step (122) is limited to a preset time interval following the communication. Similarly, in one embodiment, the preset time interval is an adjustable variable. In one embodiment, determining a mutually available time slot requires taking time zones, and possible time differences among the users, into consideration. Accordingly, following a determination that both users that are involved in the text based conversation have an electronic calendar; a further search is conducted for scheduling a meeting.

Following a positive response to the determination in step (122), calendar entries are created in the calendars of the respective users (124), and a notification message is sent to each of the users of the calendars (126) thereby informing the users of the recently scheduled meeting. Conversely, if the response to the determination at step (122) is negative, a determination is made whether the search for available time slots should be extended beyond the preset time interval (128). In one embodiment, a message can be sent to the first and second client machines to make a determination with respect to the extended search. If a decision is made to extend the search beyond the preset time interval, the pre-set time interval is adjusted (130) and the process returns to step (118). Conversely, a negative response to the determination at step (128) concludes the scheduling process for the current text based communication (132). Accordingly, the electronic calendars of each of the users are searched within a defined time interval to ascertain an intersecting time for scheduling of a meeting between the parties of the text based conversation.

Figure 2:
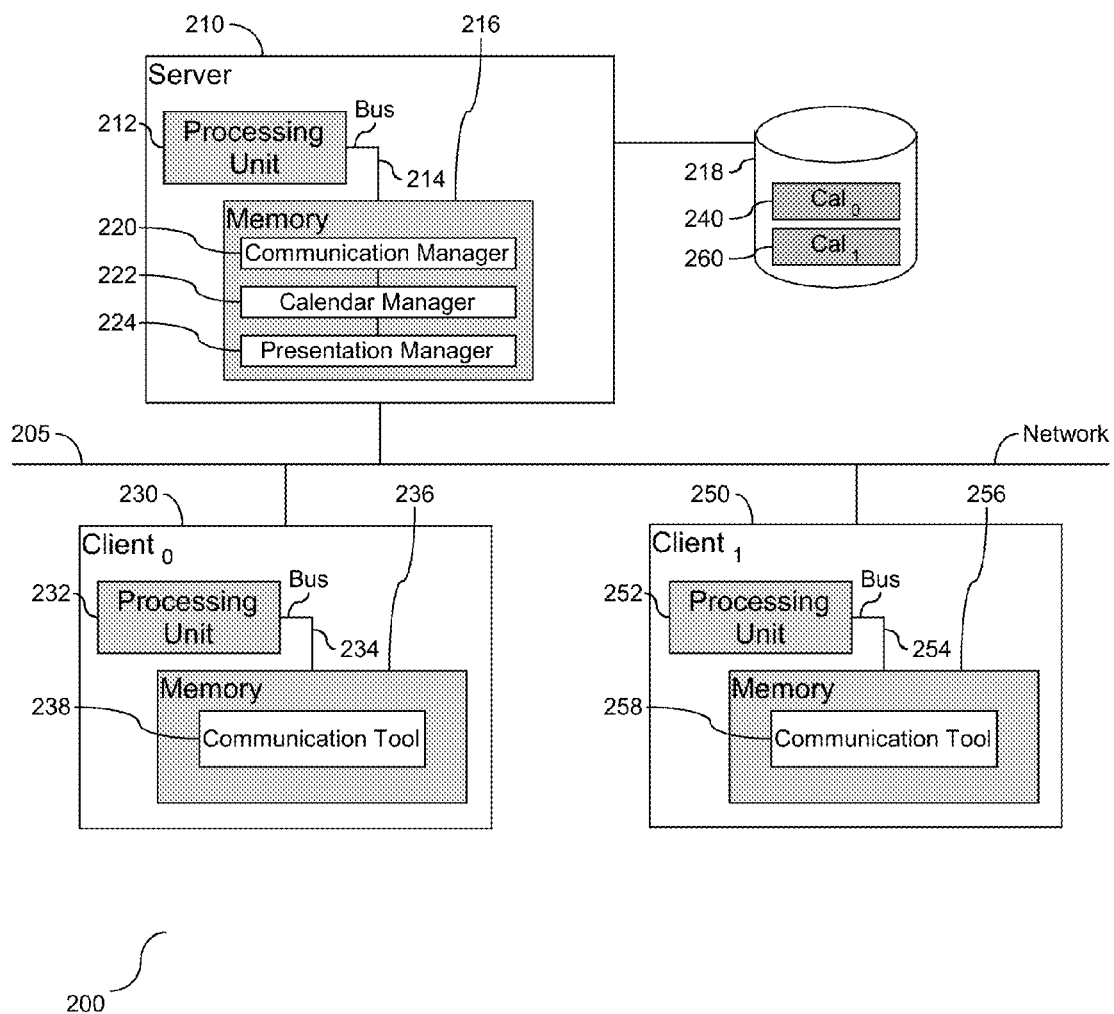
FIG. 2 is a block diagram illustrating tools embedded in a computer system to support text based communication, and more specifically for accessing and scheduling meetings on behalf of the parties taking part in the communication.

As demonstrated in the flow chart of FIG. 1, a method is employed to support extracting data from a text based messaging conversation, and more specifically, dynamically setting a meeting for the conversant on each of their respective electronic calendars. FIG. 2 is a block diagram (200) illustrating tools embedded in a computer system to support text based communication, and more specifically for accessing and scheduling meetings on behalf of the parties taking part in the communication. As shown, a computer system is provided with a server (210) in communication with at least two client machines (230) and (250) over a network (205). Although only two client machines (230) and (250) are shown herein, in one embodiment additional client machines may be provided in communication with the server (210). The server (210) is provided with a processing unit (212) in communication with memory (216) across a bus (214), and in communication with data storage (218). In one embodiment, the server (210) may communicate with remote data storage (not shown) across the network connection (205). Each of the client machines (230) and (250) may read from and write data to storage data (218) across the network connection (205).

Similarly, each of the client machines (230) and (250) is provided with hardware to support communication and scheduling. As shown, client machine (230) is provided with a processing unit (232) in communication with memory (236) across a bus (234), and client machine (250) is provided with a processing unit (252) in communication with memory (256) across a bus (254). As shown herein, each of the client machines (230) and (250) is provided with a real-time communication tool (238) and (258), respectively, with the application supporting inter-client communication. In one embodiment, the tool (238) and (258) support a real-time text based communication protocol. Each message sent or received from either of the client machines (230) or (250) is routed through the server (210). In addition, each client machine (230) and (250) has an electronic calendar (240) and (260), respectively. In one embodiment, and as shown herein, the electronic calendars (240) and (260) reside in data storage (218).

To support text based communication, the server (210) is provided with a communication manager (220), shown herein as residing in memory (216). The communication manager (220) parses each of the routed messages. More specifically, the communication manager (220) parses content embedded within the messages for one or more pre-selected words. In one embodiment, the pre-selected words are associated with verbal characteristics of a meeting. To facilitate the process of scheduling, a calendar manager (222) is provided in communication with communication manager (220). More specifically, the calendar manager (222) searches the electronic calendars (240) and (260) to find a mutually available date and time to schedule a meeting based upon the characteristics within the communicated message(s). A presentation manager (224) is provided in communication with the calendar manager (222). The presentation manager (224) presents at least one common and available date and time for the meeting within a time interval associated with the message(s).

The time interval employed by the presentation manager (224) may be a pre-defined time interval, or an adjusted time interval. More specifically, and as shown in FIG. 1, if the meeting cannot be scheduled within a pre-defined time of the message time stamp, then the time interval may be adjusted to search for a meeting time outside of the range of the pre-defined time of the message time stamp. The communication manager (220) may identify an interval for the meeting to be scheduled, including both a start time and end time, which in effect may narrow the selection of available meeting times.

In addition to finding a meeting time, the communication and calendar managers (220) and (222), respectively, may be employed to schedule a meeting location. More specifically, the functionality of the communication manager (220) may be extended to parse the content of the message(s) for at least one word, phrase, or string of characters that characterizes a meeting location. The calendar manager (222) may use the meeting location information received from the communication manager (220) to search for both a meeting time and a meeting location. In one embodiment, the calendar manager (222) may set a duration for the meeting, and if the time slot for the set duration is not available the calendar manager will notify each of the client machines (230) and (250) regarding the absence of the available time slot. Such a notification message may come in different forms of electronic mail communication, including but not limited to, text communications, real-time direct text-based communications, etc.

Once a meeting time and/or location has been ascertained, the calendar manager (222) creates a calendar entry for each of the calendars (240) and (260). To ensure that the users of the calendars are aware of the scheduled meeting, the calendar manager sends a meeting notification message to each user of the calendars (240) and (260) after the calendar entries are completed. As shown herein, the user of calendar (240) is associated with client machine (230), and the user of calendar (260) is associated with client machine (250). Accordingly, the notification messages are communicated to the respective client machines. In one embodiment, the notification message is in the form of an electronic mail communication, text communications, a real-time direct text-based communications, etc.

Figure 3:
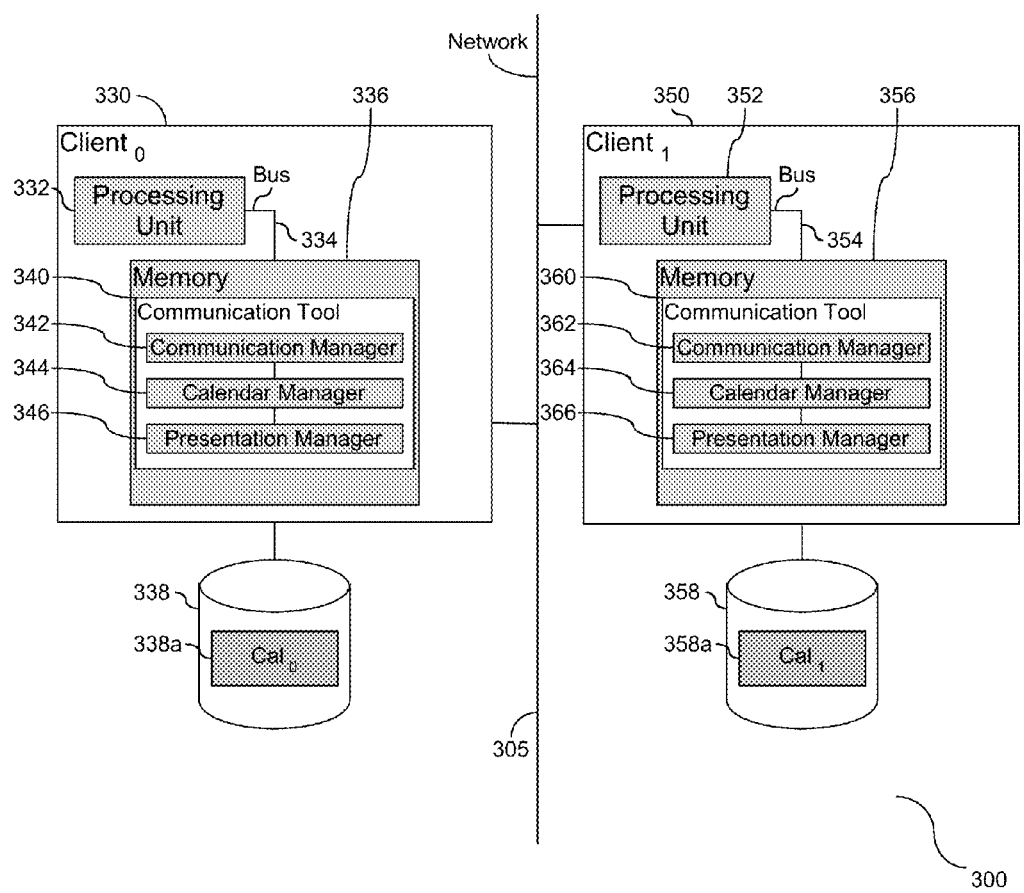
FIG. 3 is a block diagram illustrating tools embedded in a computer system to support text based communication directly between two client machines, and more specifically for accessing and scheduling meetings on behalf of the parties taking part in the communication.

Text based communication may take place directly between client machines. FIG. 3 is a block diagram (300) illustrating tools embedded in a computer system to support text based communication, and more specifically for accessing and scheduling meetings on behalf of parties taking part in the communication. As shown, a computer system is provided with two client machines (330) and (350) in communication over a network (305). Although only two client machines (330) and (350) are shown herein, in one embodiment additional client machines may be provided in communication over the network. Each of the client machines (330) and (350) is provided with hardware to support communication and scheduling. As shown, client machine (330) is provided with a processing unit (332) in communication with memory (336) across a bus (334), and client machine (350) is provided with a processing unit (352) in communication with memory (356) across a bus (354). In addition, client machine (330) is in communication with local data storage (338), and client machine (350) is in communication with local data storage (358). As shown herein, each client machine (330) and (350) has an electronic calendar (338a) and (358a), respectively, embedded in data storage (338) and (358), respectively.

Each of the client machines (330) and (350) is provided with a real-time communication tool (340) and (360), respectively, with the tools supporting inter-client communication. A message sent or received from either of the client machines (330) and (350) is routed directly therebetween. Each of the client machines (330) and (350) is provided with a communication manager (342) and (362), respectively, local to the respective communication tool (340) and (360). Upon receipt of a message by one of the communication tools (340) and (360), the communication manager (342) and (362) local to the recipient client machine parses content embedded within the message for one or more pre-selected words, phrases, or string of characters. To facilitate the process of scheduling, each of the client machines (330) and (350) is provided with a calendar manager (344) and (364), respectively. The calendar managers (344) and (364) are employed to search the local electronic calendars (338a) and (358a) to find a mutually available date and time to schedule a meeting based upon the characteristics within the communicated message(s). More specifically, at such time as client (330) receives a message via the communication tool (340), the communication manager (342) parses message content, and the calendar manager (344) searches electronic calendar (338a) for an available time slot to schedule a meeting. Communication manager (342) communicates the available time slot with communication manager (362). Each of the client machines (330) and (350) are also provided with presentation managers (346) and (366), respectively. The presentation managers (346) and (366) are each in communication with the respective communication managers (344) and (364). More specifically, the presentation managers (346) and (366) present at least one common and available date and time for the meeting to each of the client machines (330) and (350), respectively, within a time interval associated with the message(s). Accordingly, the communication tools (340) and (360) support direct client communication and meeting scheduling.

The calendar and presentation managers (344), (364), and (346), (366), support the same functionality as with the server based scheduling tool shown in FIG. 2. Messages are parsed, calendars are search, and meetings are scheduling based upon direct client communication and support.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
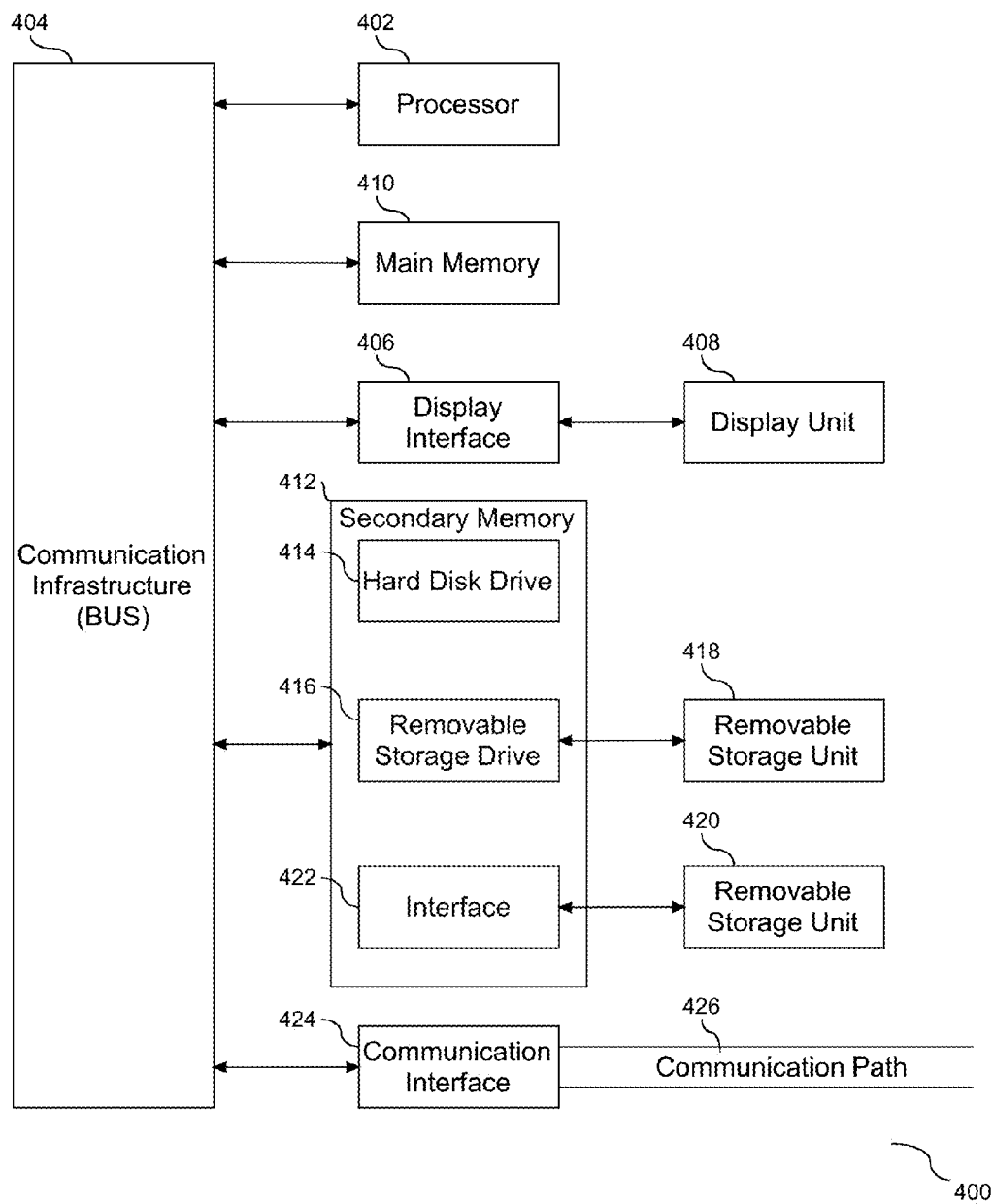
FIG. 4 is a block diagram showing a system for implementing an embodiment of the present invention.

Referring now to the block diagram of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) are in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured to apply to communication over a public network or a private network, for use with mobile communication devices, portable communication devices, etc. Accordingly, the scope of protection of this invention is limited only by the following claims and their equivalents.

We claim:

1. A computer implemented method for use with message based communication, the method comprising:
   automating meeting scheduling, including:
      a communication tool parsing message content embedded in at least one message being communicated between at least two client machines, the parsing including searching the message content for one or more select string of characters within the message, wherein the searched string of characters has at least one characteristic of a desire for a meeting;
      searching electronic calendars of each party identified within the message as being a member of the meeting, in parallel to the parsing, to find a mutually available time slot within a range to schedule the meeting based upon the at least one characteristic; and
      in response to the mutually available time slot not being available within the range, extending the range to find the mutually available time slot, wherein the extension is performed in response to the identified parties affirming the extension; and
   presenting each of the identified parties with at least one common and available date and time for the meeting.

2. The method of claim 1, further comprising parsing embedded message content for one or more select string of characters characterizing an attribute of a meeting location, and searching the electronic calendars of each of the identified parties for a matching available time slot for the requested attribute with respect to the meeting location.

3. The method of claim 2, further comprising in each of the messages identifying an interval for the meeting including a start time and an end time.

4. The method of claim 3, further comprising creating a calendar entry for each of the identified parties in response to finding a mutually available time slot for the meeting including the meeting location and the meeting interval, and sending a meeting notification message to each of the identified parties.

5. The method of claim 4, further comprising setting a duration following the communication within which to identify and create a calendar entry for the meeting, and sending a notification message to each of the identified parties in response to an absence of availability of the time slot for the meeting within the set duration.

6. The method of claim 1, wherein the message is a real-time direct text-based communication.

7. A computer implemented method for use with message based communication, the method comprising:
   a first client configured with a first electronic calendar, and a second client configured with a second electronic calendar;
   the first and second clients participating in a real-time direct text-based communication;
   a communication tool to automate meeting scheduling, including:
      parsing message content embedded in at least one message being communicated between the clients, the parsing including searching the message content for one or more select string of characters within the message, wherein the searched string of characters characterize a need for a meeting;
      searching electronic calendars of each party identified within the message as being a member of the meeting, in parallel to the parsing, to find a mutually available time slot within a range to schedule the meeting based upon the at least one characteristic; and
      in response to the mutually available time slot not being available within the range, extending the range to find the mutually available time slot, wherein the extension is performed in response to the identified parties affirming the extension; and
   in response to finding a matching available time on the first and second calendar, presenting each of the first and second clients with at least one common and available date and time for the meeting.

8. A computer system comprising:
   a server in communication with storage media;
   a computer processing unit in communication with the server and electronic calendar data stored local to the storage media, the processing unit configured to:
      parse message content embedded in at least one message from a conversation being communicated across the server, including the processing unit to search the message content for one or more select string of characters within the message content, wherein the searched string of characters includes at least one characteristic of a meeting;
      search the electronic calendar data associated with a characteristic of the message, in parallel to the parsing, to find a mutually available time slot within a range to schedule the meeting based upon the at least one characteristic; and
      in response to the mutually available time slot not being available within the range, extend the range to find the mutually available time slot, wherein the extension is performed in response to the identified parties affirming the extension; and present at least one common and available date and time for the meeting within a time interval selected from the group consisting of: a predefined time interval, and an adjusted time interval.

9. The system of claim 8, further comprising the processing unit to parse embedded message content for one or more select string of characters characterizing an attribute of a meeting location, and to search the electronic calendars associated with the characteristic of the message for a matching available time slot for the requested attribute with respect to the meeting location.

10. The system of claim 8, further comprising the processing unit to identify an interval for the meeting including a start time and an end time.

11. The system of claim 10, further comprising the processing unit to create a calendar entry for each searched calendar in response to finding a mutually available time slot for the meeting including the meeting location and the meeting interval, and to send a meeting notification message to each user of the searched calendars.

12. The system of claim 11, further comprising the processing unit to set a duration following the communication within which to identify and create a calendar entry for the meeting, and to send a notification message to each of the clients in response to an absence of availability of the time slot for the meeting within the set duration.

* * * * *